United States Patent
Manrique et al.

(10) Patent No.: US 8,955,589 B2
(45) Date of Patent: Feb. 17, 2015

(54) FORMULATION AND METHOD OF USE FOR STIMULATION OF HEAVY AND EXTRAHEAVY OIL WELLS

(75) Inventors: Pablo Manrique, Caracas (VE); Ubaldo Salazar, Valle de la Pascua (VE); Daniel Cortes, Cabudare (VE); Francis Sanchez, Los Teques (VE); Xenia Suzzarini, Los Teques (VE)

(73) Assignee: Intevep, S.A., Caracas (VE)

( * ) Notice: Subject to any disclaimer, the term of this patent is extended or adjusted under 35 U.S.C. 154(b) by 0 days.

(21) Appl. No.: 12/973,022

(22) Filed: Dec. 20, 2010

(65) Prior Publication Data

US 2012/0152535 A1   Jun. 21, 2012

(51) Int. Cl.
*E21B 43/16* (2006.01)
*E21B 43/25* (2006.01)
*C09K 8/60* (2006.01)

(52) U.S. Cl.
CPC .............. *E21B 43/25* (2013.01); *C09K 8/602* (2013.01)
USPC ...... 166/300; 166/270.1; 166/369; 166/75.15

(58) Field of Classification Search
CPC ......... E21B 43/16; E21B 43/26; E21B 43/20; E21B 43/25; C09K 8/602
USPC ................ 166/270.1, 300; 507/265, 266, 203
See application file for complete search history.

(56) References Cited

U.S. PATENT DOCUMENTS

| | | | |
|---|---|---|---|
| 3,135,326 A | 6/1964 | Santee | |
| 3,401,748 A | 9/1968 | Stratton | |
| 3,452,817 A | 7/1969 | Fallgatter | |
| 3,527,301 A | 9/1970 | Raifsnider | |
| 3,548,941 A * | 12/1970 | Graham et al. | 166/270.1 |
| 3,817,331 A | 6/1974 | Jones | |
| 3,858,656 A | 1/1975 | Flournoy et al. | |
| 3,874,454 A | 4/1975 | Clark et al. | |
| 3,878,894 A | 4/1975 | Clark et al. | |
| 3,888,308 A | 6/1975 | Gale et al. | |
| 3,946,812 A | 3/1976 | Gale et al. | |
| 3,965,984 A | 6/1976 | Clark et al. | |
| 4,004,638 A | 1/1977 | Burdyn et al. | |
| 4,018,278 A | 4/1977 | Shupe | |
| 4,042,030 A | 8/1977 | Savins et al. | |
| 4,066,124 A | 1/1978 | Carlin et al. | |
| 4,068,716 A * | 1/1978 | Allen | 166/271 |
| 4,077,471 A | 3/1978 | Shupe | |
| 4,110,228 A | 8/1978 | Tyler et al. | |
| 4,296,812 A | 10/1981 | Kalfoglou | |
| 4,494,604 A * | 1/1985 | Shaw et al. | 166/270.1 |
| 4,554,974 A | 11/1985 | Kalpakci et al. | |

(Continued)

OTHER PUBLICATIONS

"PARC400" Parafiin Asphaltene Removal & Control, retrieved Jun. 2, 2011 from http://webcache.googleusercontent.com/search?q=cache:0243WvziLUsJ:www.parc400.com/deposition.htm+api+of+asphaltene&cd=4&hl=en&ct=clnk&gl=us&source=www.google.com.*

(Continued)

*Primary Examiner* — Zakiya W Bates
*Assistant Examiner* — Silvana Runyan
(74) *Attorney, Agent, or Firm* — Bachman & LaPointe, PC (57) ABSTRACT

A method for altering flow conditions in a porous media containing hydrocarbons includes the steps of preparing a mixture of a surfactant, a co-surfactant and a carrier fluid; transporting the mixture to the porous media; and holding the mixture in the porous media in the presence of water for a period of time sufficient to form a water film on the surfaces of the porous media.

3 Claims, 4 Drawing Sheets

(56) References Cited

U.S. PATENT DOCUMENTS

| | | | |
|---|---|---|---|
| 4,601,836 A * | 7/1986 | Jones | 507/238 |
| 4,618,348 A * | 10/1986 | Hayes et al. | 44/301 |
| 4,769,161 A | 9/1988 | Angstadt | |
| 4,979,564 A | 12/1990 | Kalpakci et al. | |
| 5,076,363 A | 12/1991 | Kalpakci et al. | |
| 6,776,234 B2 | 8/2004 | Boudreau | |
| 6,929,070 B2 * | 8/2005 | Fu et al. | 166/308.2 |
| 6,972,274 B1 * | 12/2005 | Slikta et al. | 507/240 |
| 7,268,100 B2 * | 9/2007 | Kippie et al. | 507/131 |
| 7,279,447 B2 * | 10/2007 | Lal et al. | 507/139 |
| 7,312,184 B2 | 12/2007 | Boudreau | |
| 7,398,826 B2 * | 7/2008 | Hoefer et al. | 166/280.1 |
| 7,549,472 B2 * | 6/2009 | Morrow et al. | 166/263 |
| 7,566,686 B2 * | 7/2009 | Kippie et al. | 507/260 |
| 7,677,673 B2 | 3/2010 | Tranquilla et al. | |
| 7,833,943 B2 * | 11/2010 | Van Zanten et al. | 507/90 |
| 2009/0008091 A1 * | 1/2009 | Quintero et al. | 166/270.1 |
| 2010/0130384 A1 * | 5/2010 | Lightford et al. | 507/90 |
| 2010/0130389 A1 * | 5/2010 | Lightford et al. | 507/242 |
| 2011/0160103 A1 * | 6/2011 | van Zanten et al. | 507/238 |
| 2012/0004146 A1 * | 1/2012 | Van Zanten et al. | 507/103 |

OTHER PUBLICATIONS

The Engineering Toolbox, Liquids and Fluids.*

* cited by examiner

FORMULATION AND METHOD OF USE FOR STIMULATION OF HEAVY AND EXTRAHEAVY OIL WELLS

BACKGROUND OF THE INVENTION

The invention relates to a formulation and method of using same for improving well productivity in hydrocarbon reservoirs.

Improvement in productivity of heavy and extra heavy oil wells such as those found in the Orinoco River Belt in Venezuela is clearly desirable. Some of the largest reservoirs of heavy and extra heavy oil in the world are in Venezuela and hold oil having API gravity within the range of 6 to 16. Unfortunately, the production rate of much of this oil is unacceptable.

It is a high concern in the exploitation of heavy and extra heavy oil reservoirs to increase productivity during the well lifetime. With these wells, primary cold production schemes are quickly abandoned in favor of thermal methods to improve well flowability by reducing oil viscosity in the reservoir. These processes are costly and also still produce a low output in terms of final recovery. They also have serious problems of sour gases production such as $H_2S$ and $CO_2$ which are very costly to address. Such thermal recovery methods typically produce final oil recovery below 35-40%.

Venezuelan heavy and extra heavy Orinoco River Belt oil sandstones are exceptional reservoirs. 60% of the reservoirs of this type have a KH/U value between 40 and close to 1,000 in very many cases. Unlike other reservoirs, however, the oil in Venezuelan extra heavy oil reservoirs is flowable at reservoir conditions.

Even these wells, however, have a final recovery by cold production which is very low and perhaps in most cases below three (3) percent of the original oil in place. The conditions for flow of oil in those reservoirs, with even excellent petrophysical properties, are very unfavorable to the flow of oil. The components of the heavy and extra heavy oil, particularly the asphaltenes in natural form in the native oil, are capable by natural fluid-rock interactions of generating an oil-wet condition at the surface of the natural mineral components of the sandstone. This produces the most adverse conditions to flow of oil in a porous media. This is a natural oil-wet condition of the reservoir media, which is a completely different condition as compared to formation damage in the well resulting from drilling or production activities, which could also happen in the well.

The need exists for improvement in production rates from wells producing from formations containing heavy and extra heavy wells, particularly those which contain asphaltenes and other hydrocarbons which lead to oil wet flow environments.

SUMMARY OF THE INVENTION

As a response to the above problems, especially to the natural oil wet conditions of the sandstone and the extremely low well productivity and recovery of the original oil in place, the present invention provides a formulation or stimulation fluid and a method of using the formulation for improving well productivity in cold production schemes and also in producing wells using thermal methods. The result is reflected by a better flow rate in the well, a lower pressure drawdown, and an improved recovery from the drainage area of the formation.

In accordance with the invention, a method is therefore provided for altering flow conditions in a porous media containing hydrocarbons, which method comprises the steps of preparing a mixture of a surfactant, a co-surfactant and a carrier fluid; transporting the mixture to the porous media; and holding the mixture in the porous media in the presence of water for a period of time sufficient to form a water film on the surfaces of the porous media.

In further accordance with the invention, a method is provided for producing hydrocarbon from a subterranean hydrocarbon bearing formation, which method comprises the steps of (a) preparing a mixture of a surfactant, a co-surfactant and a carrier fluid; (b) transporting the mixture to the formation; (c) holding the mixture in the formation in the presence of water for a period of time sufficient to form a water film on the surfaces of the formation; (d) producing hydrocarbon through water film coated surfaces of the formation; (e) monitoring flow during the producing step; and (f) when flow decreases below a desired amount, repeating steps (a)-(e).

The result of the treatment of the present invention is a novel treated surface which enhances flow of hydrocarbons through pores defined by the treated surface, and this comprises a porous media having pore surfaces and containing heavy hydrocarbon including asphaltene, wherein the asphaltene is adhered to the pore surfaces, and wherein a water film is adhered to the pore surfaces and asphaltene.

BRIEF DESCRIPTION OF THE DRAWINGS

A detailed description of preferred embodiments of the present invention follows, with reference to the accompanying drawings, wherein.

DETAILED DESCRIPTION

The invention relates to a formulation or stimulation fluid which has a surfactant/co-surfactant mixture and a method for using same to treat surfaces of a hydrocarbon bearing formation and thereby enhance flow of hydrocarbons through same. This method is advantageously used to alter flow conditions in the formation to improve production of hydrocarbons from hydrocarbon-bearing formations.

As mentioned above, many significant hydrocarbon deposits in the world contain very large quantities of hydrocarbons under conditions where it is very difficult to produce them. One example of this is asphaltene-bearing hydrocarbon deposits in the Orinoco River Belt of Venezuela. In these formations, which typically have high and low pressures in the range of 300-1,500 psi, the heavy hydrocarbon fractions contained in the formation, especially asphaltenes, tend to adhere to the pore surfaces of the hydrocarbon and thereby create an oil-wet environment in the reservoir. As detailed above, this oil-wet flow environment is not at all conducive to production of those hydrocarbons from the formation. Further, as will be demonstrated below, this asphaltene is not easily removed because a portion of the hydrocarbon adsorbs into the rock surface making even cleaned surfaces oil wet and, therefore, unfavorable for good hydrocarbon flow. According to the invention, a water film is formed over the rock surfaces and also over the chemically adsorbed hydrocarbon so that the surfaces when coated in this manner are water wet. This greatly increases the flowability of hydrocarbons through the treated rock formation.

In accordance with the present invention, the surfactant/co-surfactant mixture is used to form a water film over the pore spaces of the formation, and also over the asphaltenes adhered to the pore surfaces, so as to provide a water-wet surface between the flow surfaces defined by the pore surface of the rock and asphaltene adhered thereto, and the volume of hydrocarbon in the formation which is intended to be produced. This water film increases flow of hydrocarbons through the formation, and thereby enhances production of hydrocarbon from the formation. Over a period of time, the water film eventually is removed by fluids flowing past the film, at which point the surfactant/co-surfactant mixture of the present invention can again be introduced into the hydrocarbon bearing formation to again deposit a fresh water film for use in the next period of production.

According to the invention, the surfactant/co-surfactant mixture preferably contains surfactant, co-surfactant and a fluid carrier, each of which has the following preferred constituents.

The surfactant is preferably selected from the group consisting of cationic surfactants, non-ionic surfactants, ampho-teric surfactants and combinations thereof. The surfactant is further preferably an ethoxylated fatty alcohol having between 4 and 60 ethoxylated groups.

Suitable non-ionic surfactants include but are not limited to octilphenol having 9-16 EO, nonylphenol with an EO number from 4 to 25, preferably 9-18, fatty acids of 9-20 EO, n-tetradecanol of 9-20 EO, n-hexadecanol of 9-20 EO, laurate of sorbitan, and polyethoxilated fatty alcohols with EO number from 4 to 25, preferably 9-20. Suitable ionic surfactants include but are not limited to n-alkyl sulfates of K or Na, n-alkyl trimethyl ammonium chloride and combinations thereof.

The co-surfactant is preferably an alcohol co-surfactant, preferably one or more n-alcohols (C1-C6), and more preferably selected from the group consisting of methanol, ethanol, propanol, butanol, pentanol, isopropanol and combinations thereof. The most preferred co-surfactant is methanol and/or ethanol.

The carrier fluid can be selected from the group consisting of organic solvents, light hydrocarbons, diluents, light crude oil and combinations thereof and water. More specifically, the carrier fluid can be light oil, a light refinery cut, gasoil, diesel, diluent and water. The most preferred carrier fluid is an oil fluid. One example is compatible light crude oils with API gravity between 20 and 45 API preferably between 20 and 25 API. Also, some mixtures of compatible crude oil with the formation fluids and/or naphtha can be used for reducing viscosity of the heavy and extraheavy oil fluid flow for transportation in surface facilities.

The surfactant/co-surfactant mixture preferably is prepared having substantially equal amounts by volume of the surfactant and co-surfactant, and the overall mixture with carrier fluid preferably contains each of the surfactant and co-surfactant in an amount between 0.5 and 20% by volume, more preferably between 1 and 4% by volume.

In accordance with the invention, the surfactant/co-surfactant mixture can be prepared by mixing the above-identified constituents at the surface and then transporting, for example by pumping, the resulting mixture or stimulation fluid into a hydrocarbon producing formation, for example through a well positioned from the surface to the subterranean formation, so that the mixture penetrates into the hydrocarbon-bearing formation around the well, typically into a radius surrounding the well of at least about 2 inches, preferably between 12 inches and as large as possible, for example up to 3 feet. The penetration area into the formation is the area to be treated in accordance with the present invention.

Once a sufficient volume of fluid is pumped into the formation, this volume is then held in place in the formation in the presence of water for a time sufficient to form the desired water film over surfaces of the pore spaces of the hydrocarbon and also over the hydrocarbons adhered to these surfaces. This advantageously provides a water-wet flow environment which is advantageous to the flow of hydrocarbon through the porous media, and therefore produces a flow environment which is far more conducive to the flow of oil than the natural oil-wet flow environment present in the well under natural formation conditions wherein the heavy hydrocarbons, and especially asphaltenes, are adhered to the pore surfaces of the porous media. The suitable amount of time to hold the fluid in the formation will vary with different wells, fluids and conditions, but will typically be between 12 and 24 hours and a preferred range of time between 18 and 24 hours.

Production from the treated well can be conducted while monitoring pressure drawdown in the well, and when the pressure drops sufficiently, the formation can be treated again in accordance with the present invention.

The typical formation for which the present invention can be utilized can be any formation wherein the forming of a water film over the pore surfaces would be beneficial to the overall hydrocarbon production from the formation. A particularly desirable application of the present invention is in formations having hydrocarbons with an API gravity of between 6 and 16, and even more preferably in formations containing hydrocarbons having an API gravity of between 6 and 12. These heavy and extra heavy hydrocarbon deposits in certain areas typically are very large in volume, but also contain asphaltenes as discussed above, and these are ideal candidates for treatment according to the present invention to enhance production. The typical rock formations containing such hydrocarbons have pore spaces which define the void volume which holds the hydrocarbons and which creates the permeability that allows the hydrocarbons to flow. The rock defining the pore surfaces of these formations are typically defined by quartz, feldspar, siliceous mineral, carbonaceous mineral, clays and combinations thereof.

Figure 1:
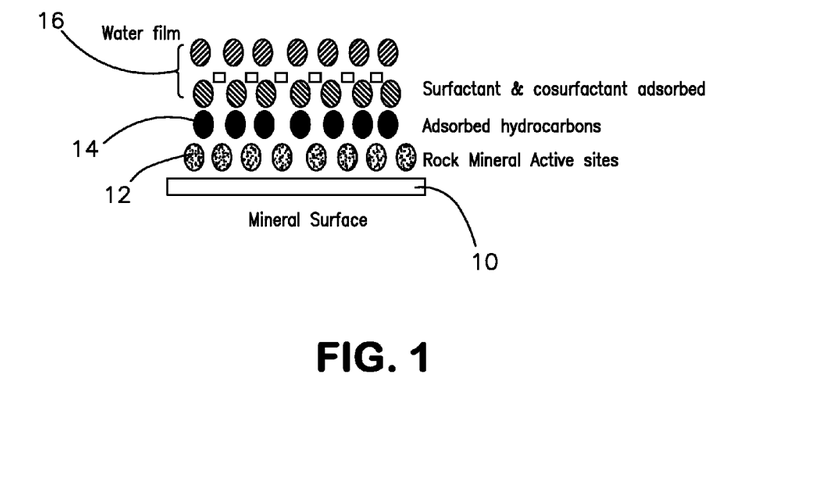
FIG. 1 schematically illustrates a treated surface in accordance with the invention.

FIG. 1 schematically illustrates a surface of a hydrocarbon bearing formation treated in accordance with the present invention. As seen in FIG. 1, a mineral surface 10 which defines the pore space of the formation has rock mineral active sites 12 along surface 10, and these rock mineral active sites 12 interact with hydrocarbons under the typical pressure in the formation such that chemically adsorbed hydrocarbons 14 are closely adhered to surface 10, particularly at rock mineral active sites 12.

According to the invention, the surfactant/co-surfactant mixture of the present invention is introduced to the formation and held there in the presence of water so that a film of water is formed over the adsorbed hydrocarbons 14 as well as the rock mineral active sites 12 of mineral surface 10. FIG. 1 shows surfactant/co-surfactant mixture adsorbed in the form of water film 16 which is schematically illustrated as a double layer to represent the surfactant/co-surfactant mixture. This produces a water-wet condition at the surface, which enhances flow of hydrocarbon through flow areas and pore space defined by such a treated surface. The water which forms the film can be water already present in the rock formation fluids and/or from the carrier fluid if a water containing carrier fluid is used. The water salinity can be in the range between 800 ppm up to 45,000 ppm.

Pressure drawdown, or the pressure drop from the formation to the well bore, is a good measure of the flowability in the formation. When the pressure drawdown is relatively small, this indicates good flowing properties in the formation to the well. While producing from a well that has been treated according to the invention, it is desirable to monitor the pressure drawdown, and after a certain amount of oil has been produced from a treated well, the pressure drawdown starts to increase. This increase in pressure drawdown indicates that the water film has been worn away or removed due to relatively high velocity flow of well fluids passing over the film to the well. This stream removes the water film by desorption of the surfactant and co-surfactant from the mineral surface and restoring the natural oil-wet initial condition at the mineral surface. At this stage, according to the invention, the well can be treated again with the same formulation, and this process can be repeated as many times as necessary until no more hydrocarbon fluids flow to the well even after treatment. With cyclic stimulation, the porous media will improve final recovery of the initial oil in place in the drainage area by cold production by potentially many times the amount of 3% typically reported as the well output obtained without stimulation. The present invention also reduces the time and need of costly thermal processes to reach this level of oil recovery.

Figure 2:
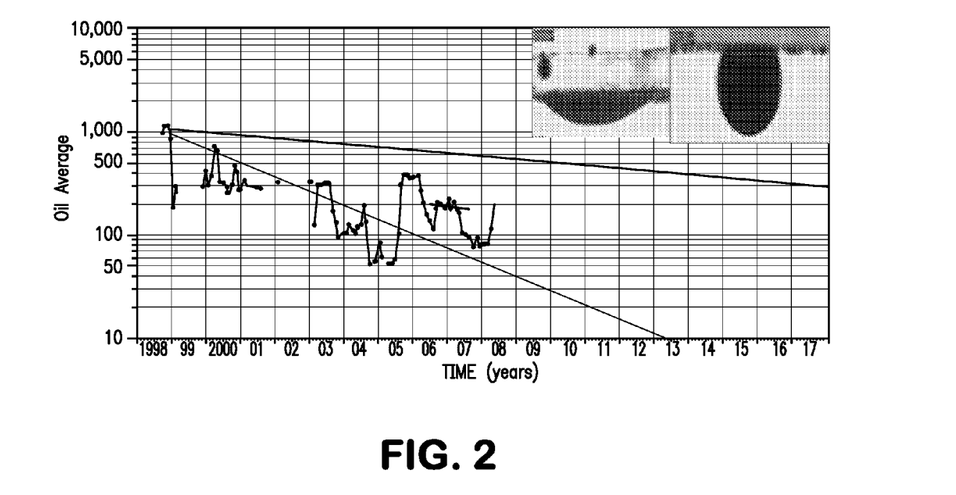
FIG. 2 illustrates typical and preferred flow rates from the hydrocarbon producing well.

FIG. 2 illustrates typical and desired flow rates from a hydrocarbon production well. The starts and stops shown in actual flow show a trend (line A) which is not desirable, while a preferred pressure behavior is shown at line B. The difference of the area between lines A and line B is an indication of greater recovery of oil from same well in same well drained area.

The following example further illustrates the invention and the results which are obtained using same.

Example 1

Crude oil and water from several wells in different areas of the Orinoco River Belt fields were collected. The oil and water were placed in closed glass vessels at several oil and water saturations, at reservoir conditions of water salinity and temperature, in a thermally controlled oven. Inside each vessel was placed a small glass plate which was monitored for wettability conditions starting with a water-wet condition and further being naturally changed to oil wet after a medium time period of about three to four weeks at reservoir temperature of 145° F. For each glass plate, wettability was measured by contact angle measurement techniques at the well temperature ranging from water-wet at the initial condition to oil wet after three weeks of aging process in the vessels at reservoir conditions.

Figure 3:
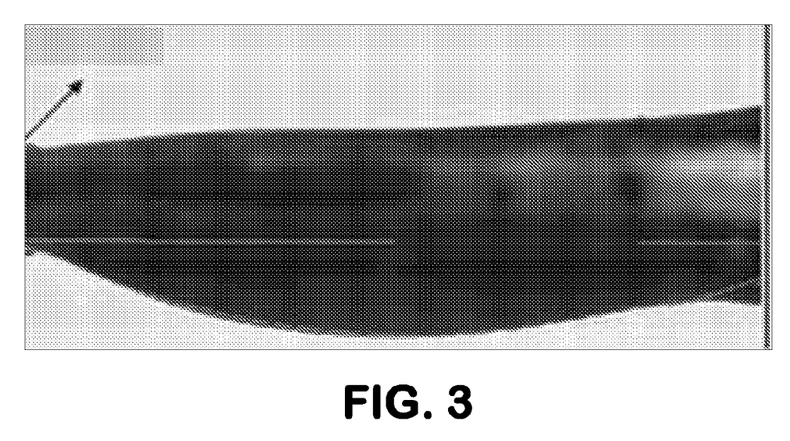
FIGS. 3 and 4 illustrate a test glass plate which is oil-wet in FIG. 3, and which has been treated in accordance with the present invention in FIG. 4.

After this treatment, the glass plates had a contact angle with oil which shows a strongly oil-wet condition as can be seen in FIG. 3, which shows the oil spreading over the plate surface.

Figure 4:
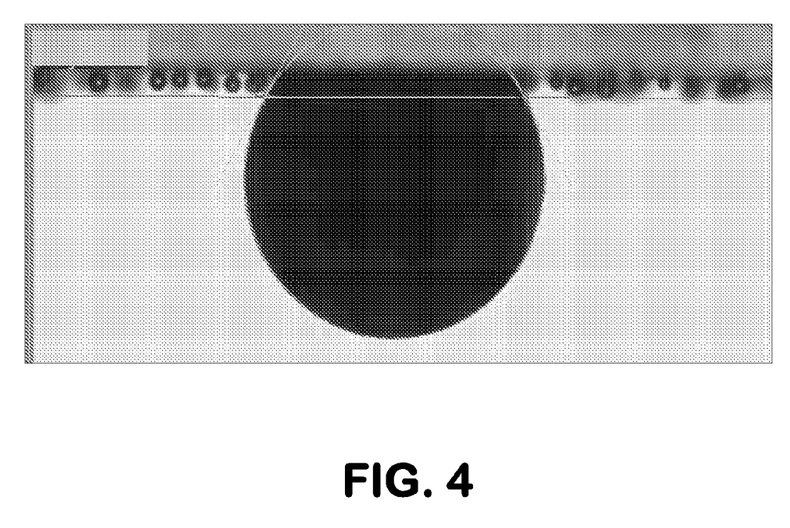

Each plate was then placed in a beaker for a soaking time with a mixture of equal amount of the well fluids in a mean average of 18% formation water and 82% extra heavy oil at 145° F. temperature, with the formulation of the present invention, which in this particular example comprised a solution of 1% volume of tridecanol with 16 ethoxylated groups and 1% volume of ethanol, both admixed with 98% diluent which was a light hydrocarbon cut used in the production area to improve the flowability of extra heavy oil at surface conditions. The mixture and the plate were held for an 8 hour exposure time at reservoir temperature of 145° F. and contact angle measurement showed wettability reversal from oil wet as shown in FIG. 3 to water wet as shown in FIG. 4. Note the bubbling up of the oil, and contact angle clearly indicative of the now water wet surface.

Similar results can be obtained by using various non-ionic and ionic surfactants. Suitable non-ionic surfactants include but are not limited to octilphenol having 9-16 EO, nonylphenol with an EO number from 4 to 25, preferably 9-18, fatty acids of 9-20 EO, n-tetradecanol of 9-20 EO, n-hexadecanol of 9-20 EO, laurate of sorbitan, and polyethoxilated fatty alcohols with EO number from 4 to 25, preferably 9-20.

Suitable ionic surfactants include but are not limited to n-alkyl sulfates of K or Na, n-alkyl trimethyl ammonium chloride and combinations thereof.

Suitable co-surfactants include but are not limited to any alcohol of the series of n-alcohols (C1-C6), such as methanol, ethanol, propanol, butanol, pentanol, isopropanol and mixtures thereof.

The carrier fluid of the surfactant composition can be light oil, a light refinery cut, gasoil, diesel, diluent and water. The most preferred carrier fluid is an oil fluid.

Figure 5:
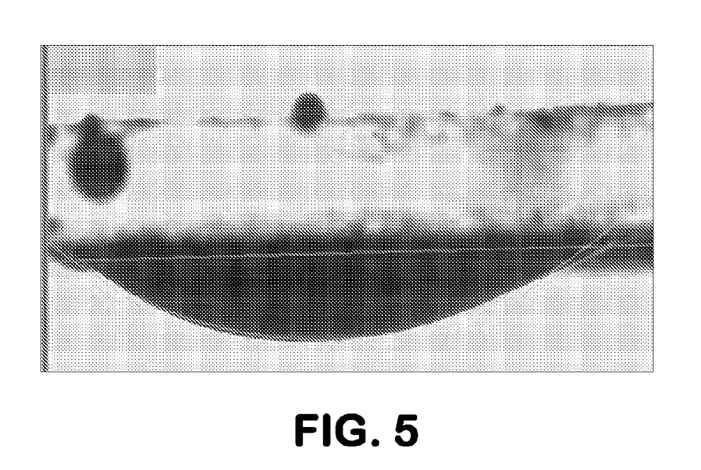
FIG. 5 shows the test plate is still oil-wet even after solvent cleaning.

Returning to the example, the glass plates were then soaked with a solution of mutual solvent for more than twenty four (24) hours to remove the water film and any visible hydrocarbon. The cleaned glass plates showed a clear and clean surface, but when a drop of water was placed on the plate, the water drop did not spread on the surface. The contact angle was measured and the plate still exhibited an oil-wet condition, as shown in FIG. 5.

This indicates that even though the mineral surface, such as sandstone, can be cleaned of adhered hydrocarbons still on that surface, there remains a chemically adsorbed film of hydrocarbon and therefore on such a mineral surface there exists a strong oil-wet wettability. As mentioned previously, the oil-wet wettability is the most adverse condition for the recovery of oil in a porous media. Thus, even by undertaking the cost and steps of removing the adhered asphaltenes, the resulting cleaned surface remains oil wet.

Use of the formulation and method of the present invention creates a water film on the mineral surface, covering the previously chemically adsorbed hydrocarbons. This film creates an interface that will conduct hydrocarbon flow for very long periods of time between stimulation cycles. A very low pressure drawdown is achieved with the increased oil flow rates, thereby providing great benefits to the productivity and final recovery of oil from the drained area of the well.

Example 2

Porous media displacement equipment was set up to run a displacement test to simulate well flow conditions with and without the use of the formulation of the present invention. A Hassler cell was selected since a simulation of the formation grain pressure can be achieved with such a cell. Synthetic core material was made with commercial sand obtaining a core permeability between 6-7 Darcies. Pressure change at the inlet and outlet of the cell was monitored with sensors. Cylinders were coupled to the cell to provide, at reservoir temperature and pressure, the reservoir fluids and the stimulation fluid. After a long period of stabilization of constant flow with only reservoir fluid, the stimulation fluid of the present invention was injected from the outlet and held for a soaking period of 24 hours. After soaking, flow was restarted and the pressure drop was monitored. A measurement was taken of the porous volume displaced and time through the core as a production fluid. The oil used as reservoir fluid had the following characteristics:

Saturated %: 9 wt
Aromatics %: 42 wt
Resins %: 38 wt
Asphaltenes %: 11 wt
Acidity: 3.02 mg KOH/g
Viscosidad CP 12,620 at 145 F

|  |  |  | Rock properties | | | | Original | Actual | |
| Well name | Reservoir name | Completion Date | Porosity % | K Darcy | Vsh | Thickness ft | Production Method | pressure psi | pressure psi | Lithology |
|---|---|---|---|---|---|---|---|---|---|---|
| CD 36 | OFIM CNX9 | April 1992 | 33 | 2.3 | 5.3 | 194 | Mechanical pump & Gravel pack | 1100 | 1095 | sandstone |
| CD 37 | OFIM CNX9 | February 1993 | 32 | 5 | 7.0 | 192 | PCP Gravel pack | 1350 | 1000 | sandstone |

API: 7.6
% C wt 70.65
% H wt 11.48
Water with 13,000 ppm NaCl

The water used had 13,000 ppm of NaCl. The temperature of the oven was 145° F. The formulation of the present invention for the displacement test was a solution of 98 ml of diluent admixed with a previously mixed and homogenized mixture of 1 ml of tridecanol ethoxylated having 17 EO groups and 1 ml of ethanol.

Figure 6:
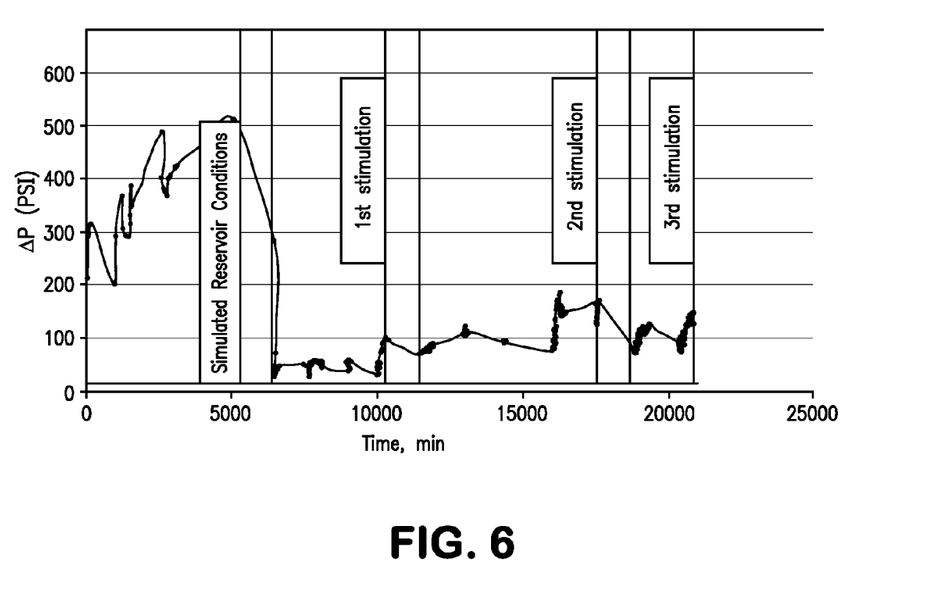
FIG. 6 illustrates results of use of the present invention in the form of pressure drop in a porous media before and after several treatments in accordance with the present invention.

Continuous flow was reached through the synthetic sand packed core saturated with oil to about 78% volume and a water saturation of about 22% by volume. The core was aged to reach an oil wet condition exposing it to pressure and temperature conditions of 1,150 psi and 145° F., which are typical of the Carabobo field of The Orinoco River Belt reservoirs, for about four weeks. Fluid flow was then reestablished by displacing oil until continuous flow was again reached. The stimulation system with diluent as a carrier fluid was then squeezed into the production area of the core and held at rest for a 24 hour time period. After that, oil was again allowed to flow, and an excellent lower differential pressure was observed for about three (3) pore volumes of oil produced in the collecting recipient. A second stimulation squeeze identical to the initial one was made and after 24 hours the flow was restarted, showing again improved properties to flow in two (2) porous media volumes of flow. A third cycle of stimulation was made observing the same results as the first cycle. FIG. 6 shows a graph of the measured pressure during the several cycles of production and squeeze.

Figure 7:
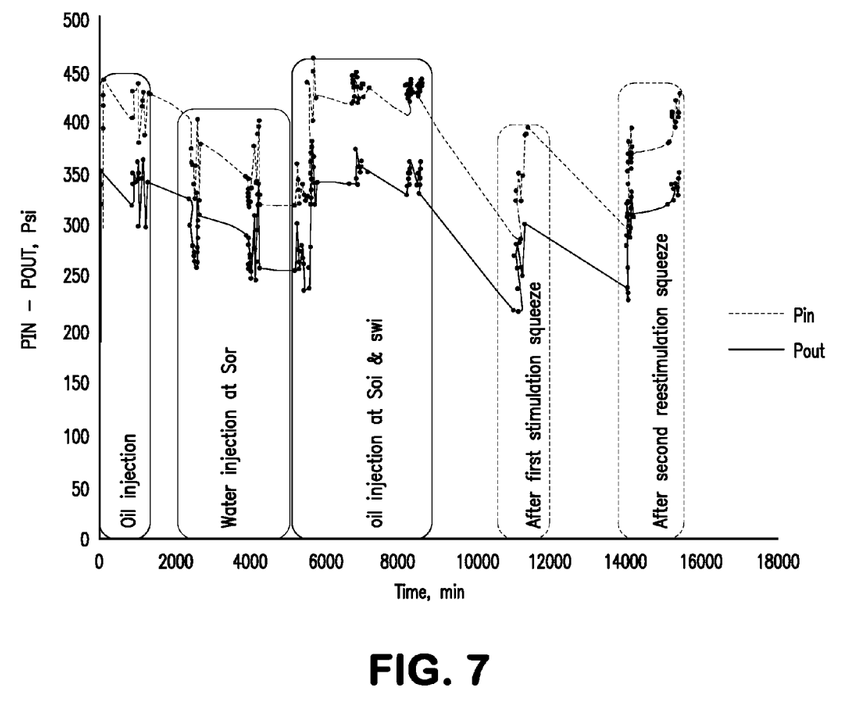
FIG. 7 further illustrates pressure drop in a test system following initial and subsequent treatments in accordance with the present invention.

The same test was run with the reservoir fluids as shown below:
OIL:
Saturated %: 8 wt
Aromatics %: 44 wt
Resins %: 35 wt
Asphaltenes %: 13 wt
Acidity: 3.90 mg KOH/g
Viscosidad CP 10,420 at 145 F
API: 12
% C wt 84.55
% H wt 11.12
Water with 2,500 ppm NaCl FIG. 7 shows the results in pressure behavior in the displacement system while producing an average of three porous volumes in between each stimulation injection.

Example 3

Two highly deviated Orinoco River Belt wells from the Cerro Negro area were selected for pilot testing. Main characteristics of the wells are:

An amount of 270 barrels of diluent, which is a light crude oil of 23 API gravity, was admixed with a previously homogenized mix of 1.3 barrels of tridecyl alcohol of 12 EO groups and 1.3 barrels of methanol in a tank of a pumping truck. The admixture was recirculated in the tank for homogenization and pumped to well CD 36 through the annular space between the tubing and the casing. The stimulation fluid of the present invention contacted the gravel pack downhole and passed to about two feet penetration in the formation. The well was closed for a soaking period of 24 hours. The well was restarted thereafter and showed an increased production of about 200 bpd that has been stable for a period of 60 days.

Another amount of 133 barrels of diluent, a light crude oil of 23 API gravity was admixed with a previously homogenized mix of 0.7 barrels of tridecyl alcohol of 12 EO groups and 0.7 barrels of methanol in a tank of a pumping truck. The admixture was recirculated in the tank for homogenization and pumped to well CD 37 through the annular space between the tubing and the casing. The stimulation fluid of the present invention contacted the gravel pack downhole and passed to about two inches of penetration in the formation. The well was closed for a soaking period of 24 hours. The well was restarted thereafter and showed a production of 80 barrels net of oil per day and has been stable for a period of 60 days thereafter. The net oil production before the stimulation was 24 barrels of net oil.

These pilot tests establish that the stimulation fluid, or formulation, of the present invention is highly effective at improving hydrocarbon flow and production through porous media treated with fluid. The fluid is made from readily available constituents, and the method can be carried out using known equipment already available for injecting other well stimulation fluids.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A method for producing hydrocarbon from porous media of a subterranean hydrocarbon bearing formation, comprising the steps of:

(a) preparing a mixture of a surfactant, a co-surfactant and a carrier fluid, wherein the mixture contains each of the surfactant and the co-surfactant at a concentration of between 1 and 4% wt;
(b) transporting the mixture to the porous media;
(c) holding the mixture in the porous media in the presence of water for a period of time sufficient to form a water film on the surfaces of the porous media;
(d) producing hydrocarbon through water film coated surfaces of the porous media of the formation;
(e) monitoring flow of hydrocarbon from the porous media during the producing step; and
(f) when the flow of hydrocarbon decreases below a desired amount, indicating that the water film on the surfaces of the porous media is removed, repeating steps (a)-(e), wherein the surfaces of the porous media prior to treatment with the mixture have hydrocarbons adhered to them, and wherein the water film is formed over the surfaces and the hydrocarbons adhered to the surfaces.

2. The method of claim 1, wherein the surfaces of the porous media prior to treatment with the mixture are oil wet.

3. The method of claim 1, wherein the hydrocarbon is native hydrocarbon naturally occurring in the porous media.

* * * * *